United States Patent
Gallandat et al.

(10) Patent No.: US 12,104,751 B2
(45) Date of Patent: Oct. 1, 2024

(54) COMBINED HYDROGEN STORAGE - COMPRESSION SYSTEM FOR THE FILLING OF HIGH PRESSURE HYDROGEN TANKS

(71) Applicant: ECOLE POLYTECHNIQUE FEDERALE DE LAUSANNE (EPFL), Lausanne (CH)

(72) Inventors: Noris Gallandat, Schwarzsee (CH); Andreas Züttel, Sion (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 315 days.

(21) Appl. No.: 17/601,824

(22) PCT Filed: Mar. 24, 2020

(86) PCT No.: PCT/EP2020/058227
§ 371 (c)(1),
(2) Date: Oct. 6, 2021

(87) PCT Pub. No.: WO2020/207790
PCT Pub. Date: Oct. 15, 2020

(65) Prior Publication Data
US 2022/0205592 A1   Jun. 30, 2022

(30) Foreign Application Priority Data
Apr. 8, 2019   (EP) ..................... 19167968

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 13/026* (2013.01);
(Continued)

(58) Field of Classification Search
CPC ........ F17C 5/06; F17C 13/025; F17C 13/026; F17C 2221/011; F17C 2223/036;
(Continued)

(56) References Cited

U.S. PATENT DOCUMENTS 4,995,235 A * 2/1991 Halene ................ C01B 3/0005
423/658.2
6,672,078 B2   1/2004 Ovshinsky
(Continued)

FOREIGN PATENT DOCUMENTS

DE    102005004590    8/2006
EP    2391846    12/2011
(Continued)

OTHER PUBLICATIONS

Pickering, et al. Induction melted AB2-type metal hydrides for hydrogen storage and compression applications, May 24, 2018, materialstoday, vol. 5, Issue 4, Part 2, 2018, pp. 10470-10478 https://doi.org/10.1016/j.matpr.2017.12.378 (Year: 2018).*

(Continued)

*Primary Examiner* — Steve S Tanenbaum
(74) *Attorney, Agent, or Firm* — Faegre Drinker Biddle & Reath LLP

(57) ABSTRACT

The present relates to a combined hydrogen storage-compression unit suitable for the filling of high-pressure (350 bar and beyond) hydrogen vessels. It includes a containment vessel filled with a hydrogen storage alloy, a heating system, a cooling system and a thermal management system. The same shall be connected directly to the hydrogen supply (e.g. an electrolyser) on one side and to the end consumer on the other side. Moreover, it offers the possibility for intermediate storage of at least one time the maximal quantity of hydrogen that is to be supplied at high pressure in a single step.

14 Claims, 4 Drawing Sheets

(52) U.S. Cl.
CPC . *F17C 2203/0648* (2013.01); *F17C 2221/011* (2013.01); *F17C 2223/036* (2013.01); *F17C 2227/0157* (2013.01); *F17C 2227/0339* (2013.01); *F17C 2250/043* (2013.01); *F17C 2250/0439* (2013.01); *F17C 2260/031* (2013.01); *F17C 2265/065* (2013.01)

(58) Field of Classification Search
CPC ...... F17C 2227/0157; F17C 2227/0339; F17C 2250/043; F17C 2250/0439; F17C 2260/031; F17C 2265/065; Y02E 60/32
USPC ........................................ 62/324.1
See application file for complete search history.

(56) References Cited

U.S. PATENT DOCUMENTS

| | | | |
|---|---|---|---|
| 6,755,225 | B1 | 6/2004 | Niedzwiecki |
| 2004/0042957 | A1* | 3/2004 | Martin ................. C01B 3/0005 423/644 |

FOREIGN PATENT DOCUMENTS

| | | |
|---|---|---|
| WO | 200169144 | 9/2001 |
| WO | 2003006874 | 1/2003 |
| WO | 2012114229 | 8/2012 |
| WO | 2016147134 | 9/2016 |

OTHER PUBLICATIONS

International Search Report and Written Opinion issued by the European Patent Office, dated Jun. 24, 2020, for International Patent Application No. PCT/EP2020/058227; 12 pages.

* cited by examiner

COMBINED HYDROGEN STORAGE - COMPRESSION SYSTEM FOR THE FILLING OF HIGH PRESSURE HYDROGEN TANKS

CROSS-REFERENCE TO RELATED APPLICATIONS

The present application is a national stage entry of International (PCT) Patent Application Number PCT/EP2020/058227, filed Mar. 24, 2020, which in turn claims priority to European Patent Application No. 19167968.7, filed Apr. 8, 2019, the subject matter of which are expressly incorporated herein by reference.

TECHNICAL FIELD

The present invention relates generally to a hydrogen infrastructure. More specifically, it relates to a combined storage-compressor unit for the fuelling of high-pressure hydrogen tanks in vehicles or other applications.

BACKGROUND OF THE ART

Metal hydrides are commonly used for the storage of hydrogen under low pressures as many metals and alloys are capable of reversibly absorbing significant amounts of hydrogen. Molecular hydrogen is dissociated at the surface before absorption and two H atoms recombine to H2 upon the desorption process. The thermodynamic aspects of hydride formation from gaseous hydrogen are described by pressure-composition isotherms shown in FIG. 1 and FIG. 2 and also with other characteristics known by the skilled person in the art. The FIG. 4 shows the logarithm of the equilibrium pressure against the reciprocal temperature. The relationship between the pressure and the temperature is exponential.

Metal hydride compressors have been disclosed in different configurations. There exist metal hydride compressors operating with a single metal alloy as well as multi-staged compressors where different alloys are combined to allow for higher compression ratios. There are compressors operating in batch mode as well as compressors operating continuously.

For example, document WO 2012114229 presents a metal hydride compressor including one or several compression modules which are interconnected and comprising a gas-distributing system and a heat transfer system which includes both a hot fluid and a cold fluid system for heating and cooling, respectively. The compressor is thermally driven using a control system that operates the switches in the flow systems as well as the circulation pumps. The control system operates two compression modules simultaneously with an opposite phase in order to provide a continuous outflow of pressurized hydrogen.

The metal hydride compressor operates at a fixed compression ratio.

Further, document EP 2391846 relates to a device where multiple compression modules are operated simultaneously. Furthermore, excessive heat is permanently removed from the heat sink side at a medium temperature level.

Also, document WO 2003006874 discloses a combined bulk storage/single stage metal hydride compressor, a hydrogen storage alloy and a hydrogen transport/distribution system. The device is used for bulk storage of hydrogen as well as for compression of said hydrogen to levels greater than or equal to 1500 psi (103.4 bar) at a temperature of less than or equal to 200° C.

Finally, document DE102005004590 describes a cyclically operating metal hydride compressor, which is disclosed for the use in motor vehicles. It comprises a pressure-resistant tank filled with metal hydride and is cyclically adsorbing respectively desorbing hydrogen.

As we can see from the above, different design and layouts for hydrogen infrastructure in general and hydrogen fuelling stations in particular have been suggested. For instance, document U.S. Pat. No. 6,672,078B2 presents a storage system based on different metal hydrides materials with specific plateau pressures and operating temperatures.

Also, document U.S. Pat. No. 6,755,225B1 presents a portable hydrogen fuelling station that can be refilled at low pressure, compress the hydrogen internally and deliver high-pressure hydrogen. However, there is no specification about the type of compressor to be used in that system.

However, the challenges of the existing hydrogen fuelling infrastructure are several folds. A typical fuelling station undergoes the following steps: (1) hydrogen production by electrolysis at medium pressure (15-40 bar), (2) mechanical compression to 200 bar, (3) transport from the production location to the fuelling station, (4) expansion to medium pressure storage vessel (30-40 bar), (5) compression in several stages to 900 bar, (6) pre-cooling of the hydrogen gas to sub-zero Celsius temperatures, (7) fuelling of the hydrogen vehicle. Such a typical fuelling station is shown in FIG. 3. Through all steps, significant losses incur and high capital and operating expenditures are caused. The end price of the hydrogen delivered is heavily impacted by this fact.

In this regard, a primary object of the invention is to provide a simple combined storage-compression unit based on metal hydrides with a variable output pressure up to and beyond 700 bar. This system shall be used as the only intermediate component between the hydrogen sources, such as an electrolyser) and the end consumers such as a car, truck, boat or other.

SUMMARY OF THE INVENTION

The instant invention relates to a combined hydrogen storage-compression module with a variable output pressure solving the above technical problem.

The system of the present invention relates to a combined hydrogen storage-compression module with a variable output pressure comprising a pressurized vessel presenting at least one inlet/outlet port in order to supply/remove hydrogen, a hydrogen storage alloy placed within the vessel, a heating system adapted to increase the temperature of the storage system in order to increase the pressure and a cooling system that can remove the heat of reaction during absorption and/or reduce the pressure of the system on demand, whereby cooling and heating of the vessel decrease and increase, respectively, the pressure inside the vessel because of the thermodynamic characteristics of the hydrogen storage alloy, a thermal management system for the control of said heating and said cooling system, a heat spreader within the pressurized vessel adapted to facilitate heat transfer within the hydrogen storage alloy, and one or more pressure sensors and temperature sensors that measure the temperature and pressure in the pressurized vessel and provide measurement data to the thermal management system, characterized in that the thermal management system, by controlling the temperature of the vessel and its content, is adapted to permit a progressive ramp up of the pressure in the pressurized vessel to be filled, thereby maintain a pressure differential between the storage-compression unit and the high pressure hydrogen tank to be filled of less than or equal to 100 bar throughout the filling process, where filled means that the pressure inside the vessel has reached its maximal rated pressure, and where said pressure differential of less than or equal to 100 bar enables to fill high pressure hydrogen tanks without pre-cooling of the hydrogen gas as no significant expansion is occurring, and the Joule-Thomson effect therefore becomes negligible.

Preferably, the hydrogen storage alloy presents an absorption plateau pressure less than or equal to 5 bar at 25° C. and a desorption plateau pressure greater than or equal to 350 bar at a temperature less than or equal to 260° C.

Even more preferably, the hydrogen storage alloy presents a desorption plateau pressure greater than or equal to 700 bar at a temperature less than or equal to 320° C.

Advantageously, the hydrogen storage system presents a hydrogen storage capacity greater than or equal to 1 kg hydrogen or, a hydrogen storage capacity greater than or equal to 5 kg hydrogen.

According to a preferred embodiment, the hydrogen storage alloy is comprised in the class of AB2 materials or AB5 materials.

Preferably, the AB2 material A is Titanium which may or may not be partially substituted with Zirconium or any other element and B includes a plurality of components selected from the group consisting of Vanadium, Manganese, Iron, Cobalt and Nickel or any other element and whereby in the AB5 material A is Lanthanum which can be partially substituted with Cerium, Neodymium and/or any other element and B is Nickel which can be partially substituted with at least one component or a plurality of components selected from the group consisting of Cobalt, Aluminium, Manganese and Iron or any other element.

Preferably, the heating system is adapted to enable desorption of the full hydrogen capacity of the storage system in less than or equal to 20 minute when the overpressure is greater or equal to 1 bar.

Even more preferably, the heating system is adapted to enable desorption of the full hydrogen capacity of the storage system in less than or equal to 5 minutes when the overpressure is greater or equal to 1 bar.

Preferably, the cooling system is adapted to enable the filling of the full hydrogen capacity of the storage system in less than or equal to 20 minutes with an overpressure of less than or equal to 1 bar.

According to a preferred embodiment, the pressure differential during progressive ramp up of the pressure in the vessels to be filled, is maintained under 10 bar or preferably, under 1 bar.

A second aspect of the invention relates to a combined hydrogen storage-compression system, wherein several individual modules according to the first aspect of the invention are connected in parallel or in series.

According to a preferred embodiment, at least two pressure containment vessels are connected and working in a sequence where one containment vessel is absorbing hydrogen while the other is desorbing hydrogen. This enables continuously to fill said high pressure hydrogen tanks.

Preferably, heat is transferred from the colder desorbing containment vessel to the hotter absorbing containment vessel using a heat pump such as a mechanical heat pump using a compressor, a metal hydrides heat pump or any other instrument fulfilling the same goal. This minimizes the net consumption of the energy required for the compression of the said pressurized vessels The system of the present invention is safe, reliable, requires minimal maintenance and allows minimizing the number of components required from hydrogen production to refuelling. The system can operate with a single or multi-stage metal hydrides beds and with a batch or continuous operation. The delivery pressure can be above 350 bar or even above 700 bar.

Preferably, the alloy chosen has a plateau pressure less than or equal to 5 bar at 25° C. More preferably, it has a plateau pressure greater than or equal to 350 bar at 300° C.

Typically, the instant invention has a hydrogen storage capacity of at least one time the maximal quantity of hydrogen to be withdrawn in a single step.

Advantageously, the storage capacity is superior to the maximal quantity of hydrogen to be withdrawn in a single step. So several cylinders can be filled in a single batch.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
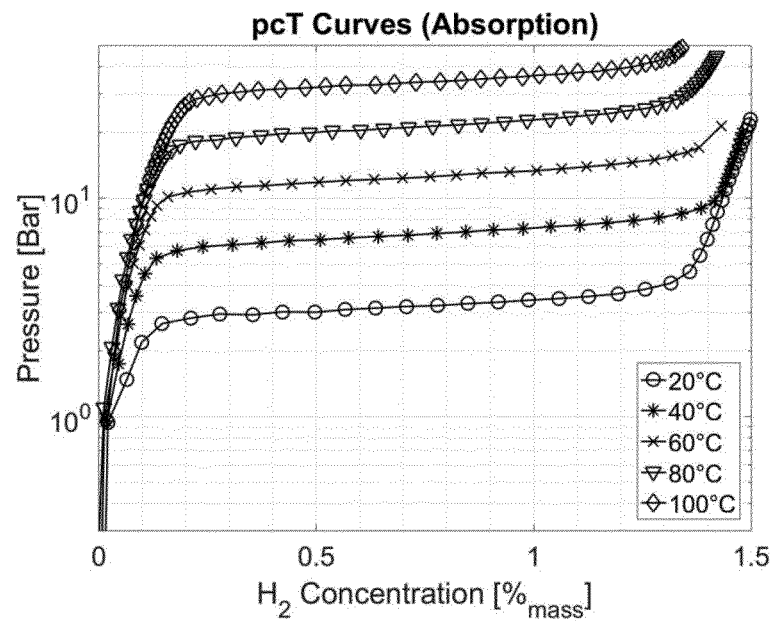
FIG. 1 represents a typical pressure-composition isothermal curve (pcI) for the absorption process of hydrogen in metal hydrides
Figure 2:
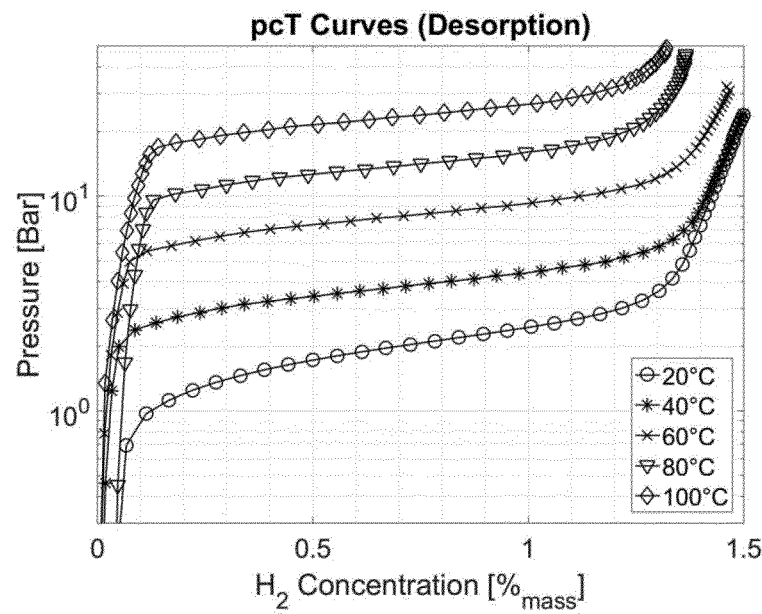
FIG. 2 represents a typical pressure-composition isothermal curve (pcI) for the desorption process of hydrogen in metal hydrides
Figure 3:
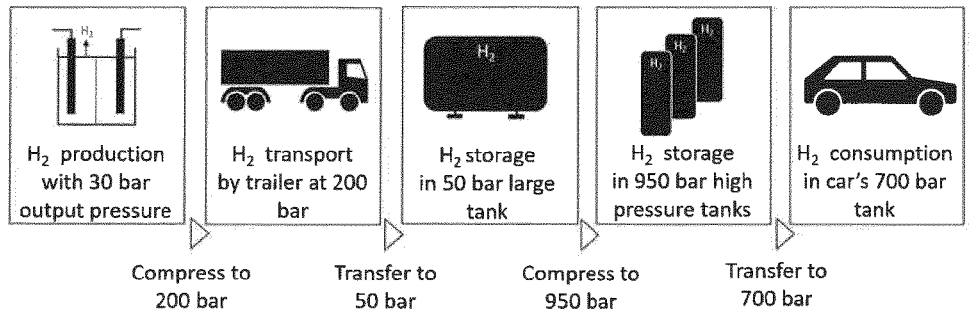
FIG. 3 is a stylistic depiction of the current typical process for the filling of hydrogen vehicles
Figure 4:
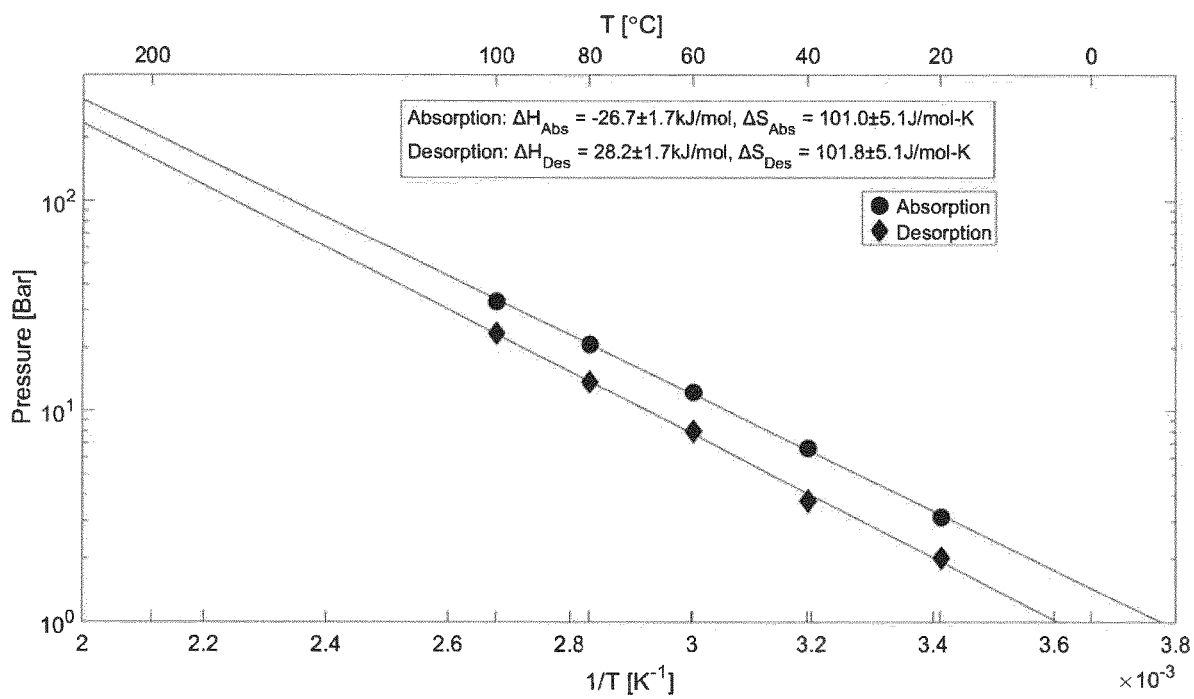
FIG. 4 is a Van't Hoff plot of an AB5 alloy suitable for the instant invention
Figure 5:
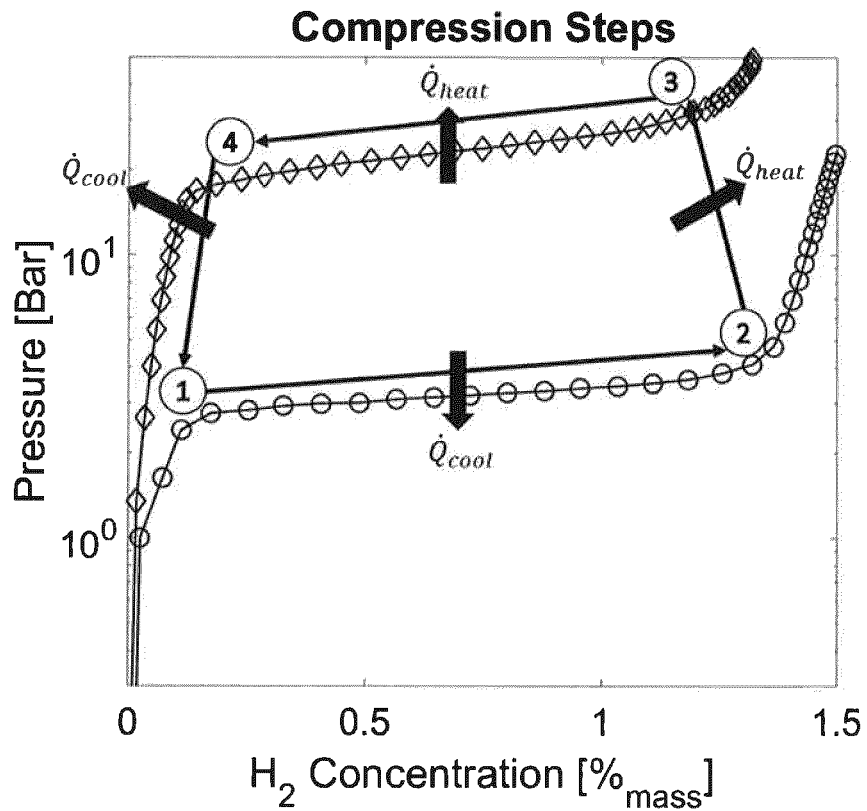
FIG. 5 is shows two pressure-composition isothermal curves (pcI) together with a typical working cycle of the present invention
Figure 6:
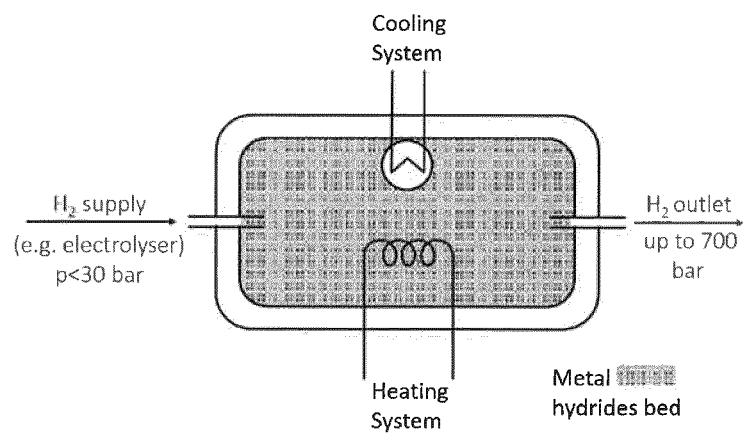
FIG. 6 is a stylistic depiction of a possible technical implementation of the instant invention

FIG. 6 shows a schematic embodiment of the present invention which relates to a combined hydrogen storage-compression unit with a variable output pressure for the filling of high-pressure hydrogen vessels, for instance in hydrogen-powered vehicles. The instant invention consists of a pressurized vessel, also called containment vessel, which has at least one inlet/outlet port in order to supply/remove hydrogen, a hydrogen storage alloy placed within the vessel, a heating system that can increase the temperature of the storage system in order to increase the pressure, a cooling system that can remove the heat of reaction during absorption and/or reduce the pressure of the system on demand, a thermal management system for the control of said heating and cooling system, and, a heat spreader within the containment vessel that facilitates heat transfer within the hydrogen storage alloy.

The containment vessel can be made out of any material withstanding the maximal outlet pressure and withstanding hydrogen corrosion. Such materials can be but are not limited to certain classes of stainless steel and carbon composite materials. The containment vessel has at least one port for the filling/removing of hydrogen. The port is preferably equipped with a filter with a size smaller than the smallest particle in order to prevent particles of the storage alloy to exit the containment vessel. The containment vessel can be made of one single unit, or of several individual units connected in series.

Advantageously, the containment vessel is either of spherical or cylindrical shape in order to spread the stresses due to high pressures. According to a preferred embodiment of the present invention, the connection to the gaseous hydrogen source is closed using some closing means, e.g. a mechanical or electrical valve or any other closing mean. Advantageously, the output connection of the compressor is opened with some opening/closing means, e.g. a valve or any other electrical, mechanical or electromechanical system.

The hydrogen storage alloy used in the instant invention has a hydrogen storage capacity higher or equal to 1.2% weight. Advantageously, the hydrogen storage alloy has a storage capacity higher or equal to 1.5% or more. The hydrogen storage alloy absorbs hydrogen at a pressure less or equal to 50 bar at a temperature greater or equal to 5° C. Advantageously, the hydrogen storage alloy absorbs hydrogen at a pressure less or equal to 5 bar at a temperature greater or equal to 25° C. The material can be but is not limited to the classes AB2 and AB5 alloys. Materials with a small hysteresis (<2 bar) between absorption and desorption are preferable.

The heating system is defined as any aggregate that can provide heat to the hydrogen storage material bed. It can be comprised of but is not limited to an electrical resistance heating, a heat exchanger with through flow of heating fluid or any other mean to elevate or maintain the temperature of the system on demand.

The cooling system is defined as any aggregate that can remove heat from the hydrogen storage material bed. It can be comprised of but is not limited to a heat spreader subject to free convection outside of the containment vessel, a forced convection circuit inside or outside of the containment vessel or any other mean to reduce or maintain the temperature of the system on demand.

The thermal management system comprises the hardware and software necessary to the control of the temperature and, thus, the control of the pressure in the hydrogen storage material. Advantageously, the temperature regulation is done with a control approach chosen in the group including PID control, MIMO control or control with any number of inputs and outputs and different sensing devices.

The heat spreader comprises any hardware that can facilitate the heat transfer from/to the heating and/or cooling system to and within the hydrogen storage alloy. It can consist of but is not limited to extended surfaces made out of high thermal conductivity materials such as aluminium and copper or selected powder with high thermal conductivity.

The described system allows to fill a high-pressure cylinder starting at a low pressure (e.g. <2 bar) to the maximal pressure of the system (e.g. 700 bar). Throughout the process, the pressure differential between the storage-compression unit and the vessel to be filled is maintained very low (<100 bar, advantageously <10 bar or <1 bar). Thereby, no significant expansion happens during the transfer between the storage-compression unit and the vessel to be filled. Therefore, no pre-cooling of the gas is required.

Figure 7:
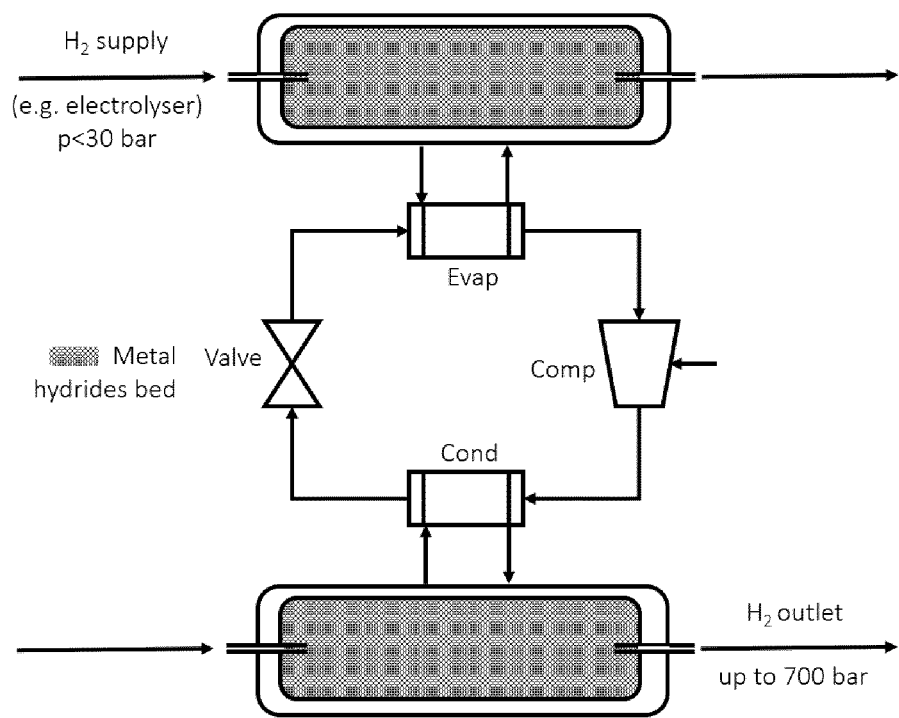
FIG. 7 is a stylistic depiction of a possible technical implementation where heat is transferred from the cold reservoir to the hot reservoir using a heat pump

In order to improve the overall energetic efficiency of the system, an arrangement is represented in FIG. 7, where two or more pressure containment vessels are connected are working in a sequence is proposed. Thereby, at least one pressure containment vessel is absorbing hydrogen and at least one pressure containment vessel is desorbing hydrogen simultaneously. Thereby, heat is transferred from the vessel absorbing hydrogen to the vessel desorbing hydrogen using a heat pump or any other mean fulfilling the same technical purpose.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example is particularly the case regarding the exact temperature used, the material used, the monitoring system, the number of stages, the temperature sensor and all the different apparatuses, which can be used in conjunction with the present invention.

The invention claimed is:

1. A combined hydrogen storage-compression module with a variable output pressure comprising
   at least one pressurized vessel presenting at least one inlet/outlet port in order to supply/remove hydrogen,
   a hydrogen storage alloy placed within the at least one pressurized vessel,
   a heating system adapted to increase the temperature of the storage system in order to increase the pressure and a cooling system that can remove the heat of reaction during absorption and/or reduce the pressure of the system on demand, whereby cooling and heating of the at least one pressurized vessel decrease and increase, respectively, the pressure inside the at least one pressurized vessel because of the thermodynamic characteristics of the hydrogen storage alloy,
   a thermal management system for the control of said heating and said cooling system,
   a heat spreader within the at least one pressurized vessel adapted to facilitate heat transfer within the hydrogen storage alloy, and
   one or more pressure sensors and temperature sensors that measure the temperature and pressure in the at least one pressurized vessel and provide measurement data to the thermal management system,
   wherein the thermal management system, by controlling the temperature of the at least one pressurized vessel and its content, is adapted to permit a progressive ramp up of the pressure in each of the at least one pressurized vessel to be filled, thereby maintain a pressure differential between the storage-compression module and a high pressure hydrogen tank to be filled of less than or equal to 100 bar throughout the filling process, where filled means that the pressure inside the at least one pressurized vessel has reached its maximal rated pressure.

2. The combined hydrogen storage-compression module according to claim 1, wherein where hydrogen is supplied by an electrolyzer or a reformer or any equivalent hydrogen source, and where hydrogen is removed to fill a high pressure hydrogen tank, such as but not limited to a hydrogen vehicle tank.

3. The combined hydrogen storage-compression module according to claim 1, wherein the hydrogen storage alloy presents an absorption plateau pressure less than or equal to 5 bar at 25° C. and a desorption plateau pressure greater than or equal to 350 bar at a temperature less than or equal to 260° C.

4. The combined hydrogen storage-compression module according to claim 1, wherein the hydrogen storage alloy presents a desorption plateau pressure greater than or equal to 700 bar at a temperature less than or equal to 320° C.

5. The combined hydrogen storage-compression module according to claim 1, wherein the hydrogen storage alloy presents a hydrogen storage capacity greater than or equal to 1 kg hydrogen or, a hydrogen storage capacity greater than or equal to 5 kg hydrogen.

6. The combined hydrogen storage-compression module according to claim 1, wherein the heating system is adapted to enable the desorption of the full hydrogen capacity of the storage system in less than or equal to five minute when the overpressure is greater or equal to 1 bar.

7. The combined hydrogen storage-compression module according to claim 1, wherein the heating system is adapted to enable the desorption of the full hydrogen capacity of the storage system in less than or equal to 20 minutes when the overpressure is greater or equal to 1 bar.

8. The combined hydrogen storage-compression module according to claim 1, wherein the cooling system is adapted to enable the filling of the full hydrogen capacity of the storage system in less than or equal to five minutes with an overpressure of less than or equal to 1 bar.

9. The combined hydrogen storage-compression module according to claim 1, wherein the pressure differential progressive ramp up of the pressure in the vessels to be filled, is maintained under 10 bar.

10. The combined hydrogen storage-compression module according to claim 1, wherein the hydrogen storage alloy is comprised in the class of AB2 materials or AB5 materials.

11. The combined hydrogen storage-compression module according to claim 10, wherein the AB2 material A is Titanium which may or may not be partially substituted with Zirconium or any other element and B includes a plurality of components selected from the group consisting of Vanadium, Manganese, Iron, Cobalt and Nickel or any other element and whereby in the AB5 material A is Lanthanum which can be partially substituted with Cerium, Neodymium and/or any other element and B is Nickel which can be partially substituted with at least one component or a plurality of components selected from the group consisting of Cobalt, Aluminium, Manganese and Iron or any other element.

12. A combined hydrogen storage-compression system, wherein several individual modules according to claim 1, are connected in parallel or in series.

13. The combined hydrogen storage-compression system of 12, where the at least one pressurized vessel are at least two pressurized vessels, which are connected and working in a sequence where one of the least two pressurized vessels is absorbing hydrogen while another one is desorbing hydrogen.

14. The combined hydrogen storage-compression system of 13, wherein, heat is transferred from the colder desorbing pressurized vessel to the hotter absorbing pressurized vessel using a heat pump.

* * * * *